(12) United States Patent
Liu

(10) Patent No.: US 11,490,449 B2
(45) Date of Patent: *Nov. 1, 2022

(54) MEDIUM ACCESS CONTROL CIRCUIT, DATA PROCESSING METHOD, AND RELATED DEVICE

(71) Applicant: Huawei Technologies Co., Ltd., Shenzhen (CN)

(72) Inventor: Peng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,320

(22) Filed: May 3, 2021

(65) Prior Publication Data

US 2021/0259048 A1 Aug. 19, 2021

Related U.S. Application Data

(63) Continuation of application No. 16/433,641, filed on Jun. 6, 2019, now Pat. No. 11,026,290.

(30) Foreign Application Priority Data

Jun. 8, 2018 (CN) .......................... 201810589793.3

(51) Int. Cl.
*H04W 80/02* (2009.01)
*H04L 49/90* (2022.01)
(Continued)

(52) U.S. Cl.
CPC ............ *H04W 80/02* (2013.01); *H04L 49/90* (2013.01); *H04L 61/2517* (2013.01); *H04L 69/16* (2013.01); *H04W 84/12* (2013.01)

(58) Field of Classification Search
CPC ...... H04W 80/02; H04W 84/12; H04L 49/90; H04L 61/2517; H04L 69/16
See application file for complete search history.

(56) References Cited

U.S. PATENT DOCUMENTS 7,873,049 B2 * 1/2011 Gaur ................. H04W 72/1273
370/418
3,036,124 A1 10/2011 Motwani
(Continued)

FOREIGN PATENT DOCUMENTS

CN 101784082 A 7/2010
EP 2501098 A1 9/2012

OTHER PUBLICATIONS

"Part 11: Wireless LAN Medium Access Control (MAC) and Physical Layer (PHY) Specifications," IEEE Std 802.11™, IEEE Computer Society, Dec. 7, 2016, 3534 pages.

*Primary Examiner* — Walter J Divito
*Assistant Examiner* — Anthony Luo
(74) *Attorney, Agent, or Firm* — Conley Rose, P.C.

(57) ABSTRACT

A medium access control circuit includes a processor, N hardware queues, and an interface circuit, where the N hardware queues are divided into a plurality of hardware queue groups. Where the first hardware queue group corresponds to a network property of the data frame based on a first mapping relationship, the first hardware queue corresponds to a service type of the data frame based on a second mapping relationship, the first mapping relationship includes mappings from network properties to hardware queue groups, and the second mapping relationship includes mappings from a plurality of service types to a plurality of hardware queues in the hardware queue group corresponding to the network property of the data frame; and then, the (Continued)

interface circuit sends the data frame from the N hardware queues through a radio channel.

20 Claims, 5 Drawing Sheets

(51) Int. Cl.
*H04L 61/2517* (2022.01)
*H04L 69/16* (2022.01)
*H04W 84/12* (2009.01)

(56) References Cited

U.S. PATENT DOCUMENTS

| | | |
|---|---|---|
| 8,861,454 B2 | 10/2014 | Gao |
| 9,204,466 B2 | 12/2015 | Park et al. |
| 9,548,938 B2 | 1/2017 | Yoshida |
| 2005/0152373 A1 | 7/2005 | Ali |
| 2006/0062189 A1 | 3/2006 | Takeuchi |
| 2008/0002636 A1 | 1/2008 | Gaur et al. |
| 2012/0250635 A1 | 10/2012 | Gao |
| 2013/0336250 A1 | 12/2013 | Park et al. |
| 2019/0380169 A1 | 12/2019 | Liu |

\* cited by examiner

MEDIUM ACCESS CONTROL CIRCUIT, DATA PROCESSING METHOD, AND RELATED DEVICE

CROSS-REFERENCE TO RELATED APPLICATIONS

This application is a continuation of U.S. patent application Ser. No. 16/433,641, filed on Jun. 6, 2019, which claims priority to Chinese Patent Application No. 201810589793.3 filed on Jun. 8, 2018. All of the afore-mentioned patent applications are hereby incorporated by reference in their entireties.

TECHNICAL FIELD

The disclosure relates to the field of wireless communications technologies, and in particular, to a medium access control (MAC) circuit, a data processing method, and a related device.

BACKGROUND

Wireless local area network (WLAN) has four access categories (ACs): a voice access category, a video access category, a background access category, and a best effort access category. Specific air interface control parameters are defined for the four ACs to achieve different channel access priorities and network performance. In the WLAN, the foregoing mechanism is referred to as enhanced distributed channel access (EDCA). To support the EDCA, four hardware queues of a wireless access point (AP) are used at a medium access control (MAC) layer. Each hardware queue corresponds to one access category and is controlled by using one set of parameters (for example: an arbitration interframe space (AIFS), a minimum contention window (CWmin), a maximum contention window (CWmax), and a transmission opportunity (TXOP)). These parameters may be adjusted to adjust channel access capabilities of different access categories. However, as a quantity of stations (STA) connected to a network increases exponentially, application scenarios of the network become increasingly complex, and transmission in the entire network becomes increasingly congested. If transmission performance of a data frame of a station in the entire network is relatively poor, transmission performance of the entire network deteriorates.

Therefore, how to improve network transmission performance of a wireless network becomes a technical problem being researched by persons skilled in the art.

SUMMARY

This application discloses a medium access control (MAC) circuit, a data processing method, and a related device, to improve network transmission performance of a wireless network.

A first aspect discloses a MAC circuit. The MAC circuit includes a processor, N hardware queues, and an interface circuit, where the N hardware queues are divided into a plurality of hardware queue groups, each hardware queue group includes a plurality of hardware queues, a total quantity of hardware queues in the plurality of hardware queue groups is less than or equal to N, the processor is connected to the N hardware queues, and the N hardware queues are connected to the interface circuit; the N hardware queues are configured to store a to-be-sent data frame; the processor is configured to place the data frame in a first hardware queue in a first hardware queue group, where the first hardware queue group corresponds to a network property of the data frame based on a first mapping relationship, the first hardware queue corresponds to a service type of the data frame based on a second mapping relationship, the first mapping relationship includes mappings from a plurality of network properties to the plurality of hardware queue groups, and the second mapping relationship includes mappings from a plurality of service types to a plurality of hardware queues in the hardware queue group corresponding to the network property of the data frame; and the interface circuit is configured to send the data frame from the N hardware queues through a radio channel.

According to the MAC circuit provided in this application, data frames with different network properties may be placed in different hardware queue groups. In this way, the data frames in virtual sub-networks identified by the different network properties are isolated from each other, so that channel access capabilities of the data frames in the virtual sub-networks identified by the different network properties do not affect each other, and different network requirements of the virtual sub-networks identified by the different network properties are met. Even if transmission performance of a data frame in a virtual sub-network identified by one network property is poor, transmission performance of data frames in virtual sub-networks identified by other network properties is not affected. Therefore, transmission performance of an entire wireless network is improved.

With reference to the first aspect, in a first possible implementation of the first aspect, the processor is further configured to: if a retransmission value of a station is greater than a first threshold, adjust a mapping of the address of the station in the first mapping relationship to a mapping from the address of the station to a second hardware queue group, where the second hardware queue group is among the N hardware queues and out of the plurality of hardware queue groups, the second hardware queue group includes one or more hardware queues, and after the adjustment, a retransmission value of a station identified by any address in a mapping pointing to the second hardware queue group in the first mapping relationship is greater than the first threshold. In other words, the MAC circuit may place, in the second hardware queue group, the data frame of the station whose retransmission value is greater than the first threshold. In this way, a data frame of a station with a poor network transmission environment is separated from a data frame of a station with a good network environment, and impact, which is caused by retransmission of the data frame of the station with the poor network transmission environment, on channel access of the data frame of the station with the good network transmission environment is reduced, and therefore, transmission performance of an entire network is improved.

With reference to the first aspect or any possible implementation of the first aspect, in a second possible implementation of the first aspect, the processor is further configured to: if a quantity of flows of a service type belonging to one of the plurality of hardware queue groups meets a first condition, add, to the second mapping relationship, a hardware queue corresponding to the service type in the hardware queue group. The first condition includes that a ratio of the quantity of flows of the service type belonging to the hardware queue group to a quantity of hardware queues corresponding to the service type is greater than a second threshold. In other words, the MAC circuit may increase the quantity of hardware queues corresponding to the service type. In this way, network congestion caused by excessive flows of a specific service type can be prevented, and a network can carry more flows of the service type while network performance gains are ensured.

With reference to the first aspect or any possible implementation of the first aspect, in a third possible implementation of the first aspect, the processor is further configured to: if the hardware queue group corresponding to the network property of the data frame does not include a hardware queue corresponding to the service type of the data frame, add, to the second mapping relationship, the hardware queue corresponding to the service type of the data frame. In other words, the MAC circuit may add a hardware queue corresponding to a new service type to the second mapping relationship, and then place a data frame of the new service type in the hardware queue corresponding to the new service type. In this way, the data frame of the new service type can gain access to a channel through an independent hardware queue, so that a channel access capability of the data frame of the new service type can be controlled independently to meet a network requirement of the new service.

According to a second aspect, an embodiment of this application provides a data processing method. The method includes: First, a processor in a MAC circuit places a data frame in a first hardware queue in a first hardware queue group, where the MAC circuit includes N hardware queues, the N hardware queues are divided into a plurality of hardware queue groups, each hardware queue group includes a plurality of hardware queues, a total quantity of hardware queues in the plurality of hardware queue groups is less than or equal to N, the first hardware queue group corresponds to a network property of the data frame based on a first mapping relationship, the first hardware queue corresponds to a service type of the data frame based on a second mapping relationship, the first mapping relationship includes mappings from a plurality of network properties to the plurality of hardware queue groups, and the second mapping relationship includes mappings from a plurality of service types to a plurality of hardware queues in the hardware queue group corresponding to the network property of the data frame; and then, an interface circuit in the MAC circuit sends the data frame from the N hardware queues through a radio channel.

According to this application, data frames with different network properties may be placed in different hardware queue groups. In this way, the data frames in virtual sub-networks identified by the different network properties are isolated from each other, so that channel access capabilities of the data frames in the virtual sub-networks identified by the different network properties do not affect each other, and different network requirements of the virtual sub-networks identified by the different network properties are met. Even if transmission performance of a data frame in a virtual sub-network identified by one network property is poor, transmission performance of data frames in virtual sub-networks identified by other network properties is not affected. Therefore, transmission performance of an entire wireless network is improved.

With reference to the second aspect, in a first possible implementation of the second aspect, the network property includes an address of a station. The method further includes: if a retransmission value of a station indicated by a receiver address is greater than a first threshold, adjusting, by the processor in the MAC circuit, a mapping of the address of the station in the first mapping relationship to a mapping from the address of the station to a second hardware queue group, where the second hardware queue group is among the N hardware queues and out of the plurality of hardware queue groups, the second hardware queue group includes one or more hardware queues, and after the adjustment, a retransmission value of a station identified by any address in a mapping pointing to the second hardware queue group in the first mapping relationship is greater than the first threshold. In other words, in this application, a data frame of a station whose retransmission value is greater than the first threshold may be placed in a hardware queue corresponding to a service type of the data frame in the second hardware queue group. In this way, a data frame of a station with a poor network transmission environment is separated from a data frame of a station with a good network environment, and impact, which is caused by retransmission of the data frame of the station with the poor network transmission environment, on channel access of the data frame of the station with the good network transmission environment is reduced, and therefore, transmission performance of an entire network is improved.

With reference to the second aspect or any possible implementation of the second aspect, in a second possible implementation of the second aspect, the method further includes: if a quantity of flows of a service type belonging to one of the plurality of hardware queue groups meets a first condition, the processor in the MAC circuit adds, to the second mapping relationship, a hardware queue corresponding to the service type in the hardware queue group. The first condition includes that a ratio of the quantity of flows of the service type belonging to the hardware queue group to a quantity of hardware queues corresponding to the service type is greater than a second threshold. In other words, in this application, the quantity of hardware queues corresponding to the service type can be increased. In this way, network congestion caused by excessive flows of a specific service type can be prevented, and a network can carry more flows of the service type while network performance gains are ensured.

With reference to the second aspect or any possible implementation of the second aspect, in a third possible implementation of the second aspect, the method further includes: if the hardware queue group corresponding to the network property of the data frame does not include a hardware queue corresponding to the service type of the data frame, adding, by the processor in the MAC circuit to the second mapping relationship, the hardware queue corresponding to the service type of the data frame. In other words, the MAC circuit may add a hardware queue corresponding to a new service type to the second mapping relationship, and then place a data frame of the new service type in the hardware queue corresponding to the new service type. In this way, the data frame of the new service type can gain access to a channel through an independent hardware queue, so that a channel access capability of the data frame of the new service type can be controlled independently to meet a network requirement of the new service.

According to a third aspect, an embodiment of this application provides a communications device. The communications device includes a medium access control MAC circuit and an antenna. The MAC circuit is the MAC circuit according to the first aspect or any possible implementation of the first aspect.

According to a fourth aspect, an embodiment of this application provides a computer readable storage medium. The computer readable storage medium stores a program instruction. When the program instruction runs on a processor, the second aspect or any possible implementation of the second aspect is implemented.

According to a fifth aspect, an embodiment of this application provides a computer program product. When the computer program product runs on a processor, the method according to the second aspect or any possible implementation of the second aspect is implemented.

BRIEF DESCRIPTION OF DRAWINGS

The following describes accompanying drawings used in embodiments of this application.

DESCRIPTION OF EMBODIMENTS

The following describes embodiments of the disclosure with reference to the accompanying drawings in the embodiments of this application.

Figure 1:
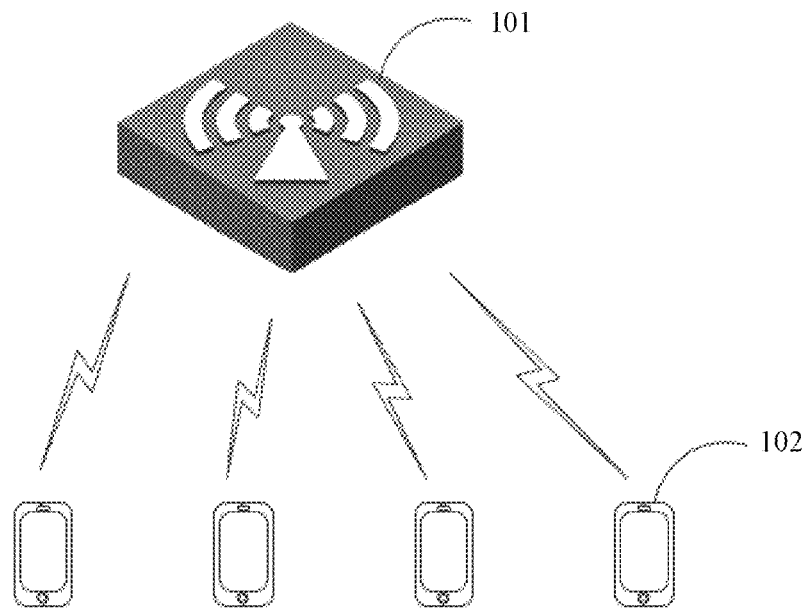
FIG. 1 is a schematic architectural diagram of a WLAN communications system according to this application.

FIG. 1 is a schematic architectural diagram of a WLAN communications system according to an embodiment of this application. The WLAN communications system 100 may include a communications device 101 and a plurality of station (STA) devices 102. As shown in FIG. 1, the communications device 101 may be a wireless access point (AP), or another station device that can be operably configured to communicate with at least one of the station devices 102. The communications device 101 may include one or more processors and one or more memories.

The station devices 102 each may wirelessly communicate with the communications device 101. The station device 102 may be a WLAN-enabled laptop computer, set-top box (STB), personal computer (PC), tablet computer, personal digital assistant (PDA), customer premises equipment (CPE), sensor, or mobile phone.

An example MAC layer includes four hardware queues. The four hardware queues separately correspond to four access categories (AC). The four access categories are a voice access category (AC_VO), a video access category (AC_VI), a background access category (AC_BK), and a best effort access category (AC_BE). To ensure different quality of service (QoS) requirements of different services, the example MAC layer includes an enhanced distributed channel access (EDCA) mechanism. The EDCA can be used to transmit service data of different access categories, to support quality of service of priority services. Each of the four access categories corresponds to one EDCA control parameter set, and different EDCA control parameter sets provide different channel access priorities for services of different access categories. The EDCA control parameter set includes an arbitration interframe space (AIFS), a minimum contention window (CWmin), a maximum contention window (CWmax), and a transmission opportunity (TXOP).

Table 1 shows default EDCA control parameters used at the example MAC layer.

TABLE 1

Default EDCA control parameters used at the example MAC layer

| Priority | AC | CWmin | CWmax | AIFS | TXOP |
|---|---|---|---|---|---|
| Lowest | AC_BK | 31 | 1023 | 7 | 0 |
| Highest | AC_BE | 31 | 1023 | 3 | 0 |
|  | AC_VI | 15 | 31 | 2 | 3.008 ms |
|  | AC_VO | 7 | 15 | 2 | 1.504 ms |

An example AP supports only four types of independent scheduling of four service types corresponding to the four access categories, and therefore has poor flexibility. If the example AP needs to support a new service type with a new QoS requirement, a data flow corresponding to the new service type and the four service types supported by the example AP need to share a hardware queue, and therefore affect each other, and cannot be controlled independently. In addition, when a plurality of virtual networks are obtained through division by one physical AP, data frames of different virtual networks still share the four hardware queues. Once STA performance of one virtual network is relatively poor, a STA of another virtual network is also affected. Consequently, overall network performance is relatively poor.

The following describes a MAC circuit provided in this application based on the foregoing WLAN communications system. The communications device in FIG. 1 includes the MAC circuit.

Figure 2:
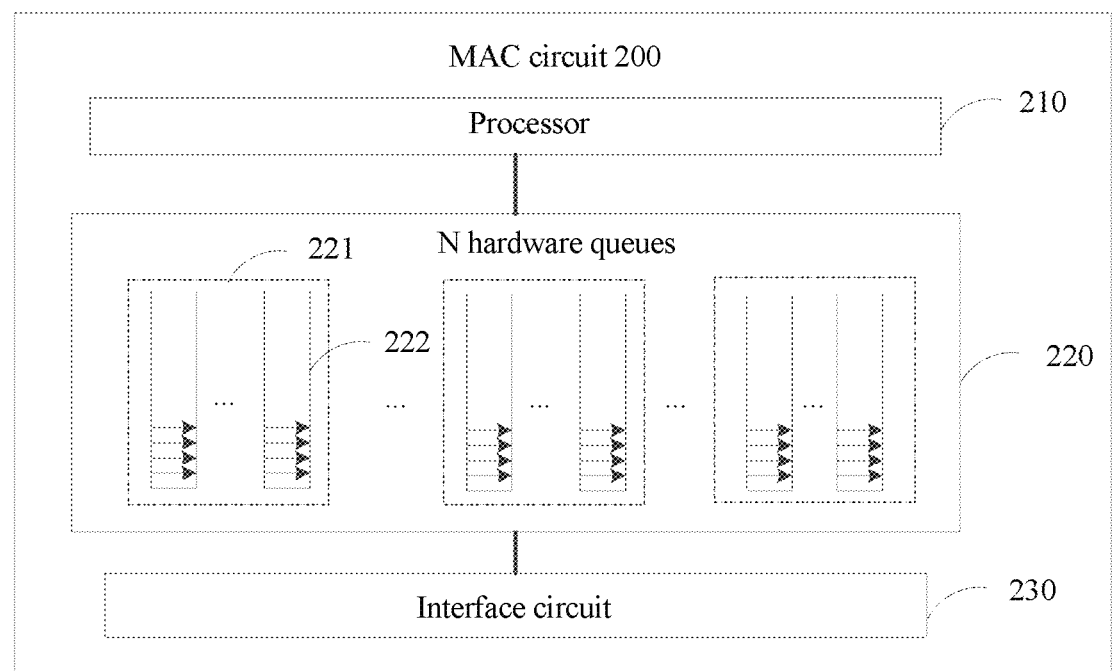
FIG. 2 is a schematic structural diagram of a MAC circuit according to this application.

FIG. 2 is a schematic structural diagram of a MAC circuit according to an embodiment of this application. As shown in FIG. 2, the MAC circuit 200 may include a processor 210, N hardware queues 220, and an interface circuit 230. The N hardware queues 220 may be configured to store a to-be-sent data frame. The N hardware queues 220 may be divided into a plurality of hardware queue groups 221, and each hardware queue group may include a plurality of hardware queues 222. A quantity of hardware queues included in the plurality of hardware queue groups 221 is less than or equal to N, the processor 210 is connected to the N hardware queues, and the N hardware queues are connected to the interface circuit.

The processor 210 may be configured to place the data frame in a first hardware queue in a first hardware queue group. The first hardware queue group corresponds to a network property of the data frame based on a first mapping relationship, the first hardware queue corresponds to a service type of the data frame based on a second mapping relationship, the first mapping relationship includes mappings from a plurality of network properties to the plurality of hardware queue groups, and the second mapping relationship includes mappings from a plurality of service types to a plurality of hardware queues in the hardware queue group corresponding to the network property of the data frame.

The network property may include one or more of a basic service set identifier (BSSID), a service set identifier (SSID), a receiver address (RA), and a station (STA) protocol type, or may include network properties of other types.

When the processor 210 is a micro control unit or other processors except central processing units, the MAC circuit may detect access categories of data frames and divide service types of the data frames based on the access categories of the data frames. One access category may correspond to one service type. For detailed content, refer to step S301 in an embodiment shown in FIG. 3.

When the processor 210 is a central processing unit (CPU), the CPU may determine a service type of the data frame through deep packet inspection (DPI), or the CPU may detect a transport layer (for example, Transmission Control Protocol (TCP) or User Datagram Protocol (UDP)) port in the data frame to determine a service type of the data frame. For example, if a TCP header in the data frame is a port number 80, 8080, or 443, the CPU may determine the service type of the data frame as a web page service; or if a TCP header in the data frame is a port number 1720, 1721, or 5000, the CPU may determine the service type of the data frame as a voice service. Alternatively, the CPU may determine the service type of the data frame in another manner. This is not limited herein. The foregoing example is merely used to explain this application and shall not be construed as a limitation.

The interface circuit 230 may be configured to send the data frame from the N hardware queues through a radio channel.

An EDCA control parameter set may be configured for the first hardware queue. The EDCA control parameter set is used to control the data frame in the first hardware queue to access the radio channel. The EDCA control parameter set includes an arbitration interframe space (AIFS), a minimum contention window (CWmin), a maximum contention window (CWmax), and a transmission opportunity (TXOP).

Optionally, the network property may include a receiver address. The processor 210 may be further configured to: if a retransmission value of a station indicated by the receiver address is greater than a first threshold, add, to the first mapping relationship, a mapping from the receiver address to a second hardware queue group. Then, the processor 210 may be further configured to place, in a hardware queue corresponding to a service type of a data frame of the station indicated by the receiver address in the second hardware queue group, the data frame of the station indicated by the receiver address. In this way, the MAC circuit can separate a data frame of a station with a poor network transmission environment from a data frame of a STA with a good network environment, and impact, which is caused by retransmission of the data frame of the station with the poor network transmission environment, on channel access of the data frame of the STA with the good network transmission environment is reduced, and therefore, transmission performance of an entire network is improved.

Optionally, the processor 210 may be further configured to: if a quantity of flows of a service type belonging to one of the plurality of hardware queue groups meets a first condition, add, to the second mapping relationship, a hardware queue corresponding to the service type in the hardware queue group. The first condition includes that a ratio of the quantity of flows of the service type belonging to the hardware queue group to a quantity of hardware queues corresponding to the service type is greater than a second threshold. In this way, network congestion caused by excessive flows of a specific service type can be prevented, and a network can carry more flows of the service type while network performance gains are ensured.

Optionally, the processor 210 may be further configured to: if the hardware queue group corresponding to the network property of the data frame does not include a hardware queue corresponding to the service type of the data frame, add, to the second mapping relationship, the hardware queue corresponding to the service type of the data frame. In this way, the data frame of the new service type can gain access to a channel through an independent hardware queue, so that a channel access capability of the data frame of the new service type can be controlled independently to meet a network requirement of the new service.

According to this embodiment of this application, data frames with different network properties may be placed in different hardware queue groups. In this way, the data frames in virtual sub-networks identified by the different network properties are isolated from each other, so that channel access capabilities of the data frames in the virtual sub-networks identified by the different network properties do not affect each other, and different network requirements of the virtual sub-networks identified by the different network properties are met. Even if transmission performance of a data frame in a virtual sub-network identified by one network property is poor, transmission performance of data frames in virtual sub-networks identified by other network properties is not affected. Therefore, transmission performance of an entire wireless network is improved.

In this embodiment of this application, the processor 210 in the MAC circuit 200 may be a CPU, or may be a micro control unit (MCU) integrated into the MAC circuit 200. When the processor 210 is the central processing unit, each hardware queue of the MAC circuit 200 may provide an interface to connect to the central processing unit, and the central processing unit is responsible for placing the data frame in a hardware queue. When the processor 210 is the micro control unit integrated into the MAC circuit 200, the micro control unit schedules the data frame to a hardware queue. For a specific function performed by the processor 210, refer to method embodiments shown in FIG. 3, FIG. 4, FIG. 5, and FIG. 6. Details are not described herein again.

The following is an embodiment of a data processing method provided in this application. An execution body of the method may be a MAC circuit or may be a communications device. The communications device may have a structural component and a function of the MAC circuit. For ease of description, in this application, the following method embodiment is described in detail by using the MAC circuit as the execution body.

Figure 3:
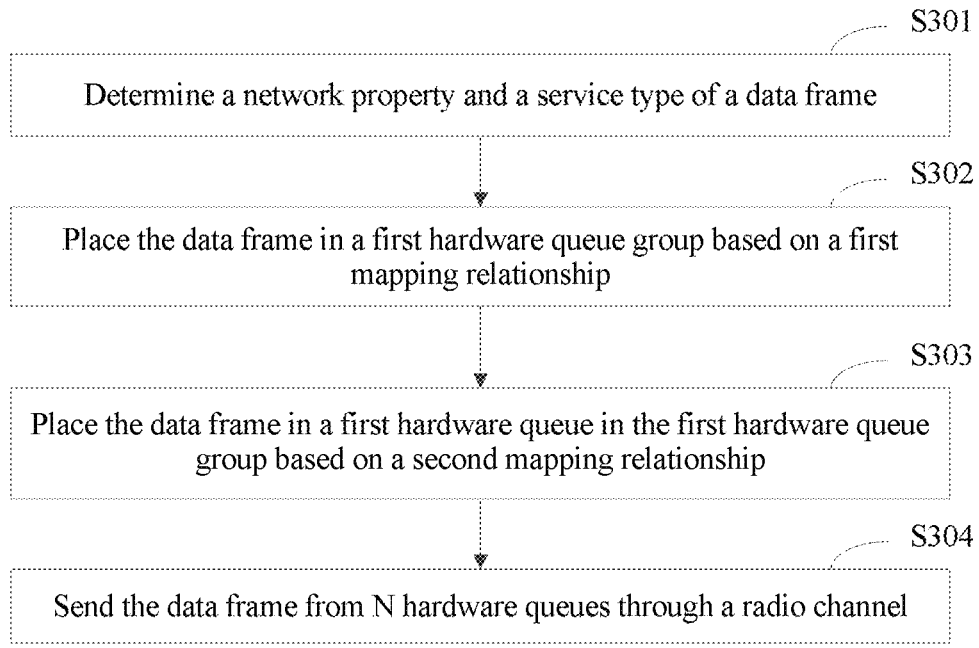
FIG. 3 is a schematic flowchart of a data processing method according to this application.

FIG. 3 is a schematic flowchart of a data processing method according to an embodiment of this application. As shown in FIG. 3, the method includes the following steps: S301 to S304.

S301. A MAC circuit determines a network property and a service type of a data frame.

The network property may include one or more of a BSSID, an SSID, an RA, and a STA protocol type, or may include other types of network properties. This is not specifically limited herein.

The MAC circuit may obtain a value of the BSSID of the data frame by parsing an address field in a frame header of the data frame, because the frame header of the data frame may include the address field, and the address field may include a source address (SA), a transmitter address (TA), and a receiver address (RA), and a value of the transmitter address is the BSSID of the data frame. Therefore, the MAC circuit may obtain the value of the BSSID of the data frame by parsing the address field in the frame header of the data frame.

The following describes how the MAC circuit determines the STA protocol type of the data frame in this embodiment of this application.

The STA protocol type may be classified into two categories: a controlled STA and an uncontrolled STA. The controlled STA is a STA that supports an Enhancements for High Efficiency WLAN solution. The uncontrolled STA is a STA that does not support the Enhancements for High Efficiency WLAN solution. A STA device in the Enhancements for High Efficiency WLAN solution supports a subcarrier-based channel. A data frame of the STA device in the Enhancements for High Efficiency WLAN solution and a data frame of a STA device not in the Enhancements for High Efficiency WLAN solution are placed in different hardware queue groups. In this way, the data frame not in the Enhancements for High Efficiency WLAN solution is prevented from affecting highly efficient transmission of the data frame in the Enhancements for High Efficiency WLAN solution. Therefore, transmission efficiency of the data frame in the Enhancements for High Efficiency WLAN solution can be improved.

The MAC circuit may parse an HT control field included in the frame header of the data frame based on the obtained STA protocol type of the data frame. The HT control field includes an uplink multi-user disable (UL MU disable) field. The MAC circuit determines whether a value of the UL MU disable field is 1. If the value of the UL MU disable field is 1, the STA is an uncontrolled STA; or if the value of the UL MU disable field is not 1, the STA is a controlled STA.

The following describes how the MAC circuit determines the service type of the data frame in this embodiment of this application.

When a processor in the MAC circuit is a CPU, the CPU may determine the service type of the data frame through deep packet inspection, or the CPU may determine the service type of the data frame by detecting a TCP/UDP port in the data frame. For example, if a TCP header in a data frame is a port number 80, 8080, or 443, the CPU may determine the service type of the data frame as a web page service; or if a TCP header in a data frame is a port number 1720, 1721, or 5000, the CPU may determine the service type of the data frame as a voice service. The foregoing example is merely used to explain this application and shall not be construed as a limitation.

When a processor in the MAC circuit is a micro control unit or another processor other than a central processing unit, the MAC circuit may detect access categories of data frames and divide service types of the data frames based on the access categories of the data frames. One access category may correspond to one service type. For example, a service type of a data frame with an access category being AC_VO may be a voice service; a service type of a data frame with an access category being AC_VI may be a video service; a service type of a data frame with an access category being AC_BK may be a background service; and a service type of a data frame with an access category being AC_BE may be a best effort service.

The MAC circuit may parse a QoS control field included in the frame header of the data frame, to detect an access category of the data frame, so as to determine a service type of the data frame. The QoS control field includes two bytes. The first 3 bits are a TID (traffic identifier) field used to indicate a traffic identifier. Values 0 to 7 of the TID are used to indicate prioritized QoS, and values 8 to 15 of the TID are used to indicate parameterized QoS. Table 2 shows correspondences between the values 0 to 7 of the TID and the access categories (AC).

TABLE 2

Correspondences between the values of the TID and the AC

| TID | AC |
| --- | --- |
| 1 | AC_BK |
| 2 | AC_BK |
| 0 | AC_BE |
| 3 | AC_BE |
| 4 | AC_VI |
| 5 | AC_VI |
| 6 | AC_VO |
| 7 | AC_VO |

It can be learned from Table 2 that values 1 and 2 of the TID correspond to the access category AC_BK, values 0 and 3 of the TID correspond to the access category AC_BE, values 4 and 5 of the TID correspond to the access category AC_VI, and values 6 and 7 of the TID correspond to the access category AC_VO. An access category of a data frame of a voice service may be AC_VO; an access category of a data frame of a video service may be AC_VI; an access category of a data frame of a background service may be AC_BK; and an access category of a data frame of a best effort service may be AC_BE. Therefore, a service type of a data frame may be determined based on a value of the TID field. The values 1 and 2 of the TID may indicate that the service type of the data frame is the background service; the values 0 and 3 of the TID may indicate that the service type of the data frame is the best effort service; the values 4 and 5 of the TID may indicate that the service type of the data frame is the video service; and the values 6 and 7 of the TID may indicate that the service type of the data frame is the voice service. Therefore, the MAC circuit may obtain the service type of the data frame by parsing the value of the TID field in the QoS control field in the frame header of the data frame.

Service types are classified based on a device type and an access category of the STA. The service types may not only include a voice service, a video service, a background service, and a best effort service, but also may include an Internet of Things (IoT) control service. Because a device address of a STA of the IoT control service is fixed, the MAC circuit may determine, based on a MAC address of the STA device, whether the service type of the data frame is the IoT control service. In other words, the MAC circuit may parse a receiver address in the data frame. If the receiver address is a preset MAC address of an IoT device, the service type of the data frame is the IoT control service, and therefore, the MAC circuit may determine that the service type of the data frame is the IoT control service.

S302. The MAC circuit places the data frame in a first hardware queue group based on a first mapping relationship, where the first hardware queue group corresponds to the network property of the data frame based on the first mapping relationship, and the first mapping relationship includes mappings from a plurality of network properties to a plurality of hardware queue groups.

The MAC circuit may determine, based on one network property of the data frame, the first hardware queue group corresponding to the data frame. For example, the network property may be the BSSID. The MAC circuit may determine, from the first mapping relationship based on the value of the BSSID, the first hardware queue group corresponding to the data frame. The first mapping relationship is a mapping from a basic service set identifier BSSID to a hardware queue group. Different BSSIDs indicate different basic service sets BSSs. Table 3 shows a mapping table from a BSSID to a hardware queue group.

TABLE 3

Mapping table from a BSSID to a hardware queue group

| Network property (BSSID) | Hardware queue group |
|---|---|
| BSSID_1 | G_1 |
| BSSID_2 | G_2 |
| BSSID_3 | G_3 |

It can be learned from the mapping table from the BSSID to a hardware queue group that is shown in Table 3 that a MAC chip includes but is not limited to three hardware queue groups: TXQG_1, TXQG_2, and TXQG_3. A data frame whose value of the BSSID is 1 (namely, BSSID_1) may be distributed to the hardware queue group TXQG_1; a data frame whose value of the BSSID is 2 (namely, BSSID_2) may be distributed to the hardware queue group TXQG_2; and a data frame whose value of the BSSID is 3 (namely, BSSID_3) may be distributed to the hardware queue group TXQG_3.

For another example, the network property may be the STA protocol type of the data frame. The MAC circuit may determine, from the first mapping relationship based on a value of the STA protocol type of the data frame, the first hardware queue group corresponding to the data frame. The value of the STA protocol type may be the value, obtained by the MAC circuit, of the UL MU disable field in the HT control field in the data frame. Alternatively, the value of the STA protocol type may be a value of the receiver address in the data frame. The first mapping relationship is a mapping from a value of the STA protocol type to a hardware queue group. If the value of the STA protocol type is the value of the UL MU disable field, a mapping table from the UL MU disable field to a hardware queue group is shown in Table 4.

TABLE 4

Mapping table from the UL MU disable field to a hardware queue group

| UL MU disable field | Hardware queue group |
|---|---|
| 1 | G_1 |
| Not 1 | G_2 |

It can be learned from the mapping table from the UL MU disable field to a hardware queue group that is shown in Table 4 that the MAC chip includes but is not limited to two hardware queue groups G_1 and G_2. A data frame whose value of the UL MU disable field is 1 may be distributed to the hardware queue group G_1; and a data frame whose value of the UL MU disable field is not 1 may be distributed to the hardware queue group G_2. In Table 4, the MAC chip includes but is not limited to the two hardware queue groups G_1 and G_2.

The MAC circuit may determine, based on a plurality of network properties of the data frame, the first hardware queue group corresponding to the data frame. The plurality of network properties may be a BSSID and a STA protocol type of the data frame. Mappings from a BSSID and a STA protocol type of the data frame to a hardware queue group may be shown in Table 5.

TABLE 5

Mapping table from a BSSID and a STA protocol type of the data frame to a hardware queue group

| Network property (BSSID) | Network property (STA protocol type) | Hardware queue group |
|---|---|---|
| BSSID_1 | Uncontrolled STA | G_1 |
|  | Controlled STA | G_2 |
| BSSID_2 | Uncontrolled STA | G_3 |
|  | Controlled STA | G_4 |

It can learned from the mapping table from a BSSID and a STA protocol type of the data frame to a hardware queue group that is shown in Table 5 that a data frame with a network property vector (BSSID_1, uncontrolled STA) may be distributed to a hardware queue group G_1, a data frame with a network property vector (BSSID_1, controlled STA) may be distributed to a hardware queue group G_2, a data frame with a network property vector (BSSID_2, uncontrolled STA) may be distributed to a hardware queue group G_3, and a data frame with a network property vector (BSSID_2, controlled STA) may be distributed to a hardware queue group G_4. The foregoing example is merely used to explain this application and shall not be construed as a limitation.

S303. The MAC circuit places the data frame in a first hardware queue in the first hardware queue group based on a second mapping relationship, where the first hardware queue corresponds to the service type of the data frame based on the second mapping relationship, and the second mapping relationship includes mappings from a plurality of service types to a plurality of hardware queues in the hardware queue group corresponding to the network property of the data frame.

After determining the first hardware queue group based on the network property, the MAC circuit may further determine, in the first hardware queue group, the first hardware queue corresponding to the data frame based on the service type.

For example, when service types include the voice service, the video service, the background service, and the best effort service, the second mapping relationship may be a mapping from a service type to a hardware queue in the first hardware queue group, and the first hardware queue group may include hardware queues Q_1, Q_2, Q_3, and Q_4. The mapping from a service type to a hardware queue in the first hardware queue group may be shown in Table 6.

TABLE 6

Mapping table from a service type to a hardware queue in the first hardware queue group

| Service type | Hardware queue |
|---|---|
| Voice service | Q_1 |
| Video service | Q_2 |
| Background service | Q_3 |
| Best effort service | Q_4 |

It can be learned from the mapping table from a service type to a hardware queue in the first hardware queue group that is shown in Table 6, a data frame of the voice service may be placed in a hardware queue Q_1, a data frame of the video service may be placed in a hardware queue Q_2, a data frame of the background service may be placed in a hardware queue Q_3, and a data frame of the best effort service may be placed in a hardware queue Q_4. In Table 6, the first hardware queue group includes but is not limited to the four hardware queues Q_1, Q_2, Q_3, and Q_4.

In this embodiment of this application, after determining the first hardware queue group based on the network property of the data frame, the MAC circuit may further determine, in the first hardware queue group, the first hardware queue corresponding to the data frame based on the service type of the data frame. In this way, the MAC circuit may distribute data frames of different service types to different hardware queues, and may provide services of different priorities for the different service types, thereby improving efficiency of wireless medium access in a network.

S304. The MAC circuit sends the data frame from N hardware queues through a radio channel.

An EDCA control parameter set is configured in a hardware queue in a hardware queue group. The EDCA control parameter set is used to control the data frame in the first hardware queue to access the channel. The EDCA control parameter set includes an AIFS, a CWmin, a CWmax, and a TXOP. EDCA control parameter sets in different hardware queues may be the same or may be different. This is not limited herein. Each hardware queue may independently perform contention based on the TXOP in the EDCA control parameter set. When idle-state duration of the channel is the arbitration interframe space AIFS of the hardware queue, a backoff counter (BO) in the hardware queue starts backoff countdown. Duration of the backoff performed by the hardware queue is determined by the minimum contention window CWmin and the maximum contention window CWmax. The data frame in the hardware queue can access the channel only when the backoff counter BO in the hardware queue counts down to 0.

In a possible case, backoff counters BOs in a plurality of hardware queues simultaneously count down to 0. In this case, the MAC circuit may determine, based on priorities of the hardware queues, a hardware queue for accessing a channel. A hardware queue of a higher priority preferentially obtains the channel through contention. For example, the first hardware queue group may include the four hardware queues Q_1, Q_2, Q_3, and Q_4, and the voice service corresponds to the hardware queue Q_1, the video service corresponds to the hardware queue Q_2, the best effort service corresponds to the hardware queue Q_3, and the background service corresponds to the hardware queue Q_4. The service types in descending order of priorities may be the voice service, the video service, the best effort service, and the background service. When a backoff counter BO in the hardware queue Q_1 and a backoff counter BO in the hardware queue Q_2 simultaneously count down to 0, the MAC circuit may enable, based on a fact that a priority of the voice service is higher than a priority of the video service, a data frame in the hardware queue Q_1 to preferentially access a channel, and enable a data frame in the hardware queue Q_2 to wait until a next interframe space and then contend for a channel through backoff counting.

Optionally, when backoff counters BOs in a plurality of hardware queues simultaneously count down to 0, the MAC circuit may alternatively determine, through polling, a hardware queue for accessing a channel. For example, the first hardware queue group may include the four hardware queues Q_1, Q_2, Q_3, and Q_4, and the MAC circuit may periodically sequentially check, through roll polling, whether the four hardware queues obtain a channel through contention. When the MAC circuit checks, during polling, the hardware queue Q_1 and backoff counters BOs of the hardware queue Q_1 and the hardware queue Q_2 simultaneously count down to 0, the MAC circuit enables a data frame in the hardware queue Q_1 to preferentially access the channel, and enable a data frame in the hardware queue Q_2 to wait until a next arbitration interframe space and then contend for a channel through backoff counting. When the MAC circuit checks, during polling, the hardware queue Q_2 and backoff counters BOs of the hardware queue Q_1 and the hardware queue Q_2 simultaneously count down to 0, the MAC circuit enables a data frame in the hardware queue Q_2 to preferentially access the channel, and enable a data frame in the hardware queue Q_1 to wait until a next interframe space and then contend for a channel through backoff counting. According to the polling-based scheduling manner, the MAC circuit may quickly determine, when backoff time of a plurality of hardware queues simultaneously reaches 0, a hardware queue for accessing a channel. In this way, a network delay caused by a contention collision between hardware queues is reduced, and network performance is improved.

According to this embodiment of this application, the MAC circuit may place data frames with different network properties in different hardware queue groups. In this way, the data frames in virtual sub-networks identified by the different network properties are isolated from each other, so that channel access capabilities of the data frames in the virtual sub-networks identified by the different network properties do not affect each other, and different network requirements of the virtual sub-networks identified by the different network properties are met. Even if transmission performance of a data frame in a virtual sub-network identified by one network property is poor, transmission performance of data frames in virtual sub-networks identified by other network properties is not affected. Therefore, transmission performance of an entire wireless network is improved.

The following describes in detail specific implementations of the first mapping relationship or the second mapping relationship in this application in different application scenarios with reference to a plurality of embodiments.

Figure 4:
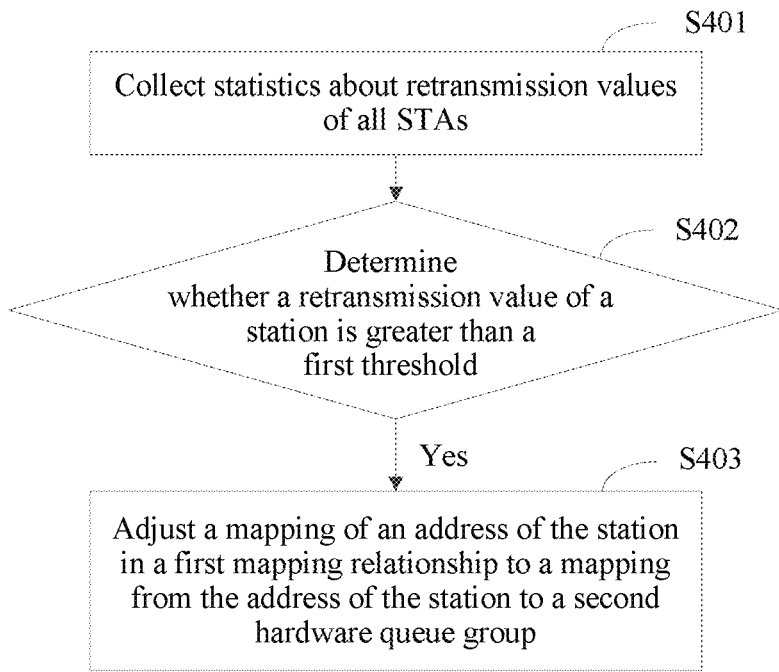
FIG. 4 is a schematic flowchart of another data processing method according to this application.

In an embodiment shown in FIG. 4, a MAC circuit may distribute a data frame of a non-responsive STA (a STA whose retransmission value is greater than a first threshold) to an independent hardware queue group, to separate the data frame from a data frame of a responsive STA (a STA whose data frame retransmission value is less than or equal to the first threshold). Detailed content is described below.

FIG. 4 is a schematic flowchart of another data processing method according to an embodiment of this application. The method is applied to the MAC circuit shown in FIG. 2. As shown in FIG. 4, the method includes the following steps: S401 to S403.

S401. The MAC circuit collects statistics about retransmission values of all STAs.

The MAC circuit may periodically collect statistics about a data frame retransmission value of each STA. A period of the statistical collection may be 1 ms, 2 ms, 5 ms, or a longer time. This is not limited herein. The retransmission value may be a quantity of times a data frame of the STA is retransmitted within one statistical period, or may be a ratio of a quantity of retransmitted data frames transferred by the STA to a total quantity of data frames transferred by the STA to a MAC layer within one period.

S402. The MAC circuit determines whether a retransmission value of a station is greater than a first threshold; and if the retransmission value of the station is greater than the first threshold, S403 is performed to adjust a mapping of an address of the station in a first mapping relationship to a mapping from the address of the station to a second hardware queue group.

If the retransmission value is the quantity of times a data frame of the STA is retransmitted within one statistical period, the first threshold may be 2, 3, 5, or greater. This is not limited herein. If the retransmission value is the ratio of the quantity of retransmitted data frames transferred by the STA to the total quantity of data frames transferred by the STA to the MAC layer within one period, the first threshold may be 1, 0.9, 0.5, or less. This is not limited herein.

S403. The MAC circuit adjusts a mapping of an address of the station in a first mapping relationship to a mapping from the address of the station to a second hardware queue group.

The second hardware queue group is among the N hardware queues and out of the plurality of hardware queue groups, the second hardware queue group includes one or more hardware queues, and after the adjustment, a retransmission value of a station identified by any address in a mapping pointing to the second hardware queue group in the first mapping relationship is greater than the first threshold.

The MAC circuit may place, in the second hardware queue group, a data frame of the station identified by the address of the station.

For example, if a retransmission value of a station indicated by a receiver address RA_3 is greater than the first threshold, the MAC circuit may update the first mapping relationship by adding, to the first mapping relationship, a mapping from the receiver address to the second hardware queue group. A table of comparison between the first mapping relationship before the update and the first mapping relationship after the update may be shown in Table 7.

TABLE 7

Comparison between the first mapping relationship before the update and the first mapping relationship after the update

| First mapping relationship before the update | | First mapping relationship after the update | |
| --- | --- | --- | --- |
| Network property | Hardware queue group | Network property | Hardware queue group |
| BSSID_1 | G_1 | BSSID_1 Not RA_3 | G_1 |
| BSSID_2 | G_2 | BSSID_2 Not RA_3 | G_2 |
| | | RA_3 | G_3 |

As shown in Table 7, in the first mapping relationship before the update, the first mapping relationship includes first hardware queue groups G_1 and G_2. A data frame with a BSSID_1 is placed in the hardware queue group G_1 and a data frame with a BSSID_2 is placed in the hardware queue group G_2. The first mapping relationship after the update includes the first hardware queue groups G_1 and G_2 and a second hardware queue group G_3. A data frame with a STA indicated by RA_3 is placed in the hardware queue group G_3; a data frame with the BSSID_1 and non-RA_3 is placed in the hardware queue group G_1; and a data frame with the BSSID_2 and non-RA_3 is placed in the hardware queue group G_2. The hardware queue group G_3 includes one or more hardware queues. The foregoing example is merely used to explain this application and shall not be construed as a limitation.

In this embodiment of this application, the MAC circuit places the data frame of the non-responsive STA (a STA whose data frame retransmission value is greater than the first threshold) to the independent hardware queue group. Therefore, congestion of an entire network that is caused by a plurality of times of retransmission of the data frame of the non-responsive STA can be reduced, and network performance is improved.

Optionally, the MAC circuit may alternatively periodically detect the data frame of the non-responsive STA; and when the retransmission value of the data frame of the non-responsive STA recovers to lower than the first threshold in a subsequent detection period, the non-responsive STA turns into a responsive STA. In this case, for distribution of a data frame of the responsive STA, refer to step S302 in the method embodiment shown in FIG. 3: The MAC circuit places the data frame in a first hardware queue group. Detailed content is not described herein again. In this way, after a retransmission ratio of the data frame of the non-responsive STA becomes lower, the MAC circuit recovers a distribution path for the data frame of the non-responsive STA to a hardware queue group corresponding to a data frame of the responsive STA. Therefore, transmission quality of the data frame can be improved after the non-responsive STA recovers to a responsive state.

Figure 7:
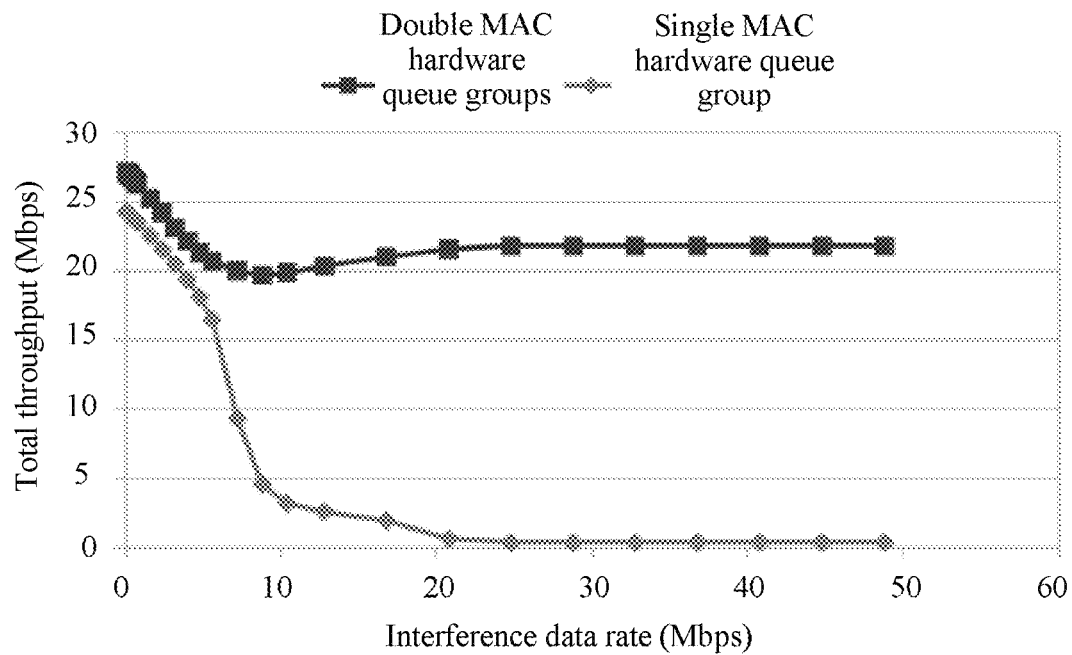
FIG. 7 is a schematic diagram of benefit comparison between a network optimization solution and an example solution according to this application.

For a diagram of benefit comparison between the embodiment shown in FIG. 4 and an example solution, refer to FIG. 7. FIG. 7 is a schematic diagram of benefit comparison between a network optimization solution and an example solution according to this application. As shown in FIG. 7, a horizontal axis indicates an interference data rate (unit: Mbit/s). A higher interference data rate indicates a higher data frame retransmission ratio of a STA. A vertical axis indicates a total throughput (unit: Mbit/s) of an entire network. A case in which double hardware queue groups are used indicates the network optimization solution provided in the embodiment shown in FIG. 4, to be specific, a data frame of a non-responsive STA is distributed to an independent hardware queue group, so that the data frame is separated from a hardware queue group for a responsive STA. A case in which a single hardware queue group is used indicates an example optimization solution, to be specific, a data frame of a responsive STA and a data frame of a non-responsive STA are distributed to a same hardware queue group. It can be learned from FIG. 7 that as interference data increases, a total throughput of a network using double hardware queue groups becomes higher than a total throughput of a network using a single hardware queue group. In other words, the network optimization solution provided in the embodiment shown in FIG. 4 can improve a total throughput of a network.

In the embodiment shown in FIG. 4, the MAC circuit distributes the data frame of the non-responsive STA (a STA whose retransmission value is greater than the first threshold) to the independent hardware queue group. Therefore, congestion of an entire network that is caused by a plurality of times of retransmission of the data frame of the non-responsive STA can be reduced, and an overall throughput of the network is improved.

Figure 5:
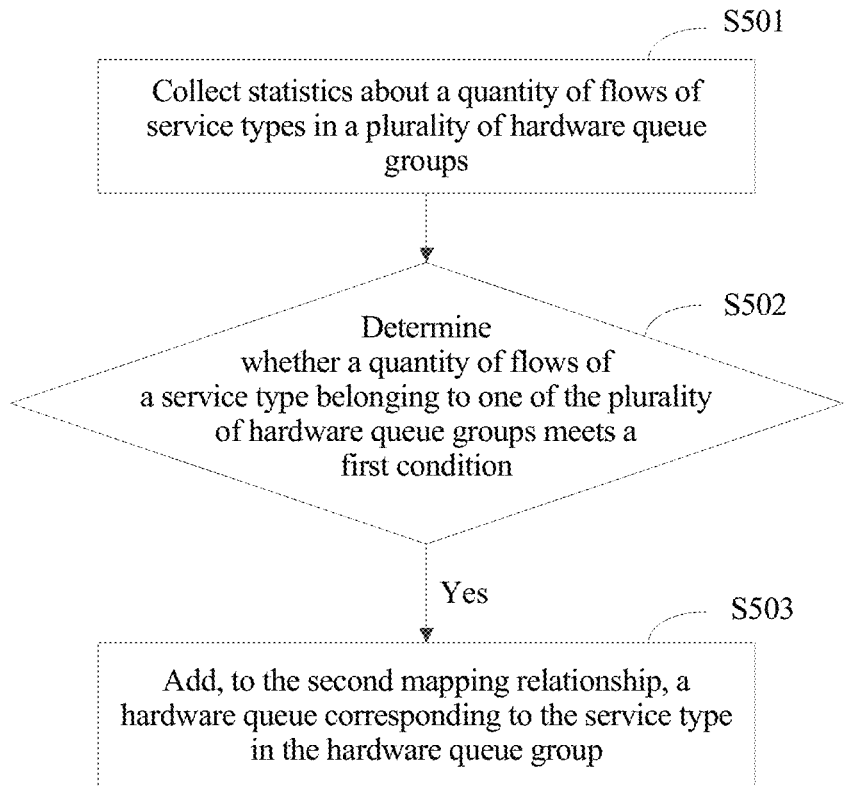
FIG. 5 is a schematic flowchart of still another data processing method according to this application.

In the embodiment shown in FIG. 5, the MAC circuit may adjust a quantity of hardware queues corresponding to a service type. Detailed content is described below.

FIG. 5 is a schematic flowchart of still another data processing method according to an embodiment of this application. The method is applied to the MAC circuit shown in FIG. 2. As shown in FIG. 5, the method includes the following steps: S501 to S503.

S501. The MAC circuit collects statistics about a quantity of flows of each service type in a plurality of hardware queue groups.

The MAC circuit may collect statistics about the quantity of flows of each service type in the plurality of hardware queue groups. The flows may be data frame sequences with same receiver addresses and same service types. For example, the MAC circuit may collect statistics about a quantity of flows for performing a voice service in a basic service set BSSID_1, the MAC circuit may collect statistics about a quantity of flows for performing a video service in a basic service set BSSID_1, the MAC circuit may collect statistics about a quantity of flows for performing a background service in a basic service set BSSID_1, or the MAC circuit may collect statistics about a quantity of flows for performing a best effort service in a basic service set BSSID_1. The foregoing example is merely used to explain this application and shall not be construed as a limitation.

S502. The MAC circuit determines whether a quantity of flows of a service type belonging to one of the plurality of hardware queue groups meets a first condition; and if the quantity of flows of the service type belonging to the one of the plurality of hardware queue groups meets the first condition, the MAC circuit performs step S503: The MAC circuit adds, to the second mapping relationship, a hardware queue corresponding to the service type in the hardware queue group.

The first condition includes that a ratio of the quantity of flows of the service type belonging to the hardware queue group to a quantity of hardware queues corresponding to the service type belonging to the hardware queue group is greater than a second threshold. The first condition may alternatively be another condition, for example: a quantity of STAs belonging to the service type of the data frame is greater than a third threshold. This is not limited herein.

S503. The MAC circuit adds, to the second mapping relationship, a hardware queue corresponding to the service type in the hardware queue group.

There may be one or more hardware queues corresponding to the service type in the hardware queue group. When adding hardware queues corresponding to the service type, the MAC circuit may add one hardware queue at a time or may add a plurality of hardware queues at a time. This is not limited herein.

For example, in a hardware queue group G_1 corresponding to the basic service set BSSID_1, the MAC circuit may learn, through statistical collection, that there are 18 flows of a voice service, but there may be 2 hardware queues corresponding to the voice service in the hardware queue group G_1, to be specific, hardware queues Q_1 and Q_5, and the second threshold may be 8. In this case, a ratio of the quantity of flows of the voice service to a quantity of hardware queues corresponding to the voice service is 9. Therefore, the ratio (9) of the quantity of flows of the voice service to the quantity of hardware queues corresponding to the voice service is greater than the second threshold (8), in other words, the first condition is met; in this case, the MAC circuit may add, to the second mapping relationship, a hardware queue corresponding to the voice service in the hardware queue group G_1. The quantity of hardware queues corresponding to the voice service may be increased to 3: hardware queues Q_1, Q_5, and Q_6. The MAC circuit may evenly map the flows of the voice service to the hardware queues Q_1, Q_5, and Q_6. In other words, the hardware queues Q_1, Q_5, and Q_6 each have data frames of 6 flows of the voice service. The foregoing example is merely used to explain this application and shall not be construed as a limitation.

Figure 8:
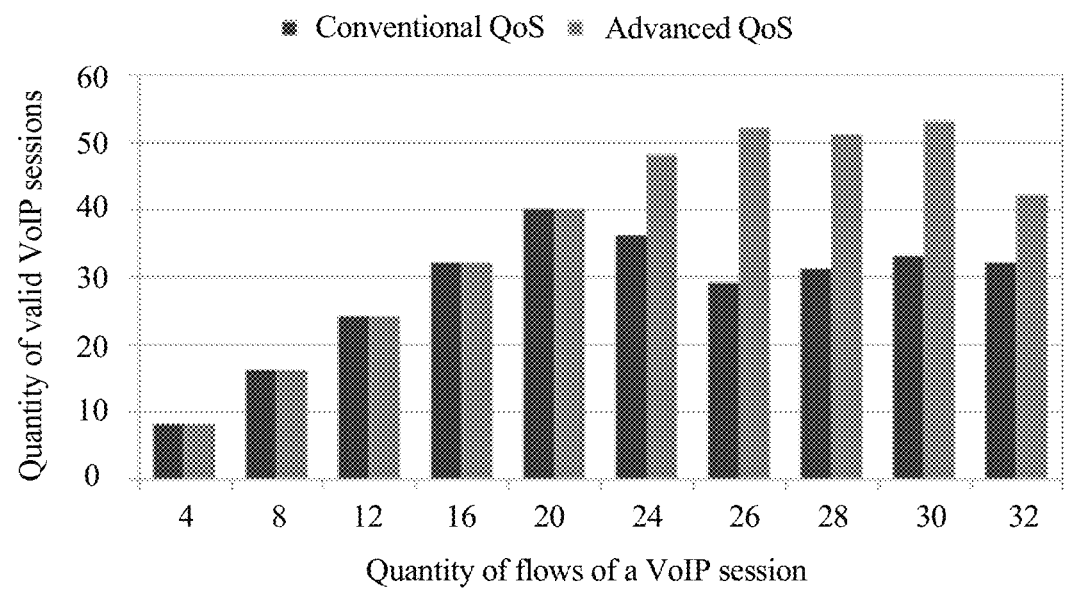
FIG. 8 is a schematic diagram of benefit comparison between another network optimization solution and an example solution according to this application.

For a diagram of benefit comparison between the embodiment shown in FIG. 5 and an example solution, refer to FIG. 8. FIG. 8 is a schematic diagram of benefit comparison between a network optimization solution and an example solution according to this application. As shown in FIG. 8, a horizontal axis indicates a quantity of flows of a Voice over Internet Protocol (VoIP) session, and a vertical axis indicates a quantity of valid VoIP sessions. Advanced QoS indicates a network optimization solution provided in the embodiment shown in FIG. 5 of this application, to be specific, one or more hardware queues are added to a first hardware queue group to evenly share flows of a voice service. Example QoS indicates an example technical solution, to be specific, data frames of all flows of a voice service in the first hardware queue group are distributed to a same hardware queue. It can be learned from FIG. 8 that when a quantity of flows of the VoIP session increases to over 20, a quantity of valid VoIP sessions corresponding to the advanced QoS is greater than a quantity of valid VoIP sessions corresponding to the example QoS, in other words, the network optimization solution provided in the embodiment shown in FIG. 5 can carry more valid services.

In the embodiment shown in FIG. 5, the MAC circuit collects statistics about a ratio of a quantity of flows of a service type in any hardware queue group and a quantity of hardware queues corresponding to the same service type in the hardware queue group; and when the quantity of flows exceeds a hardware queue load threshold, the MAC circuit adds one or more hardware queues to share the flows of the service type. Therefore, more valid services can be accommodated in a wireless network.

Figure 6:
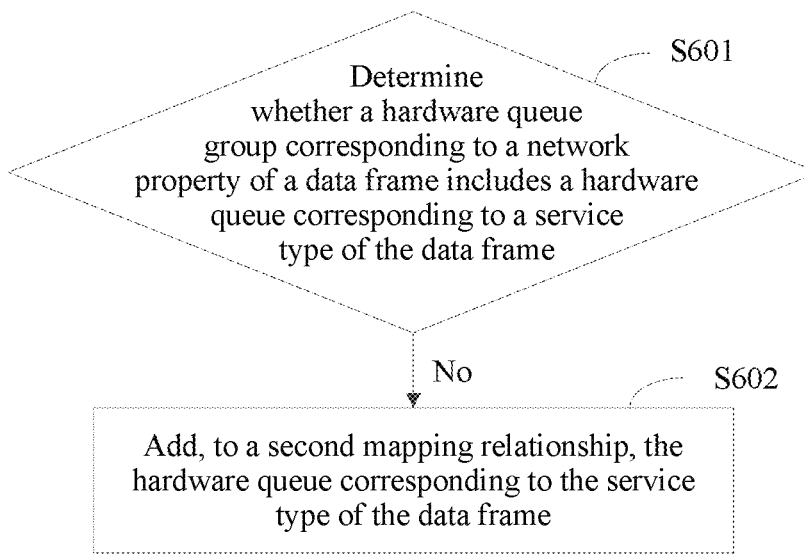
FIG. 6 is a schematic flowchart of yet another data processing method according to this application.

In an embodiment shown in FIG. 6, the MAC circuit may determine whether the first hardware queue group includes a hardware queue corresponding to the service type of the data frame; and if the first hardware queue group does not include the hardware queue corresponding to the service type of the data frame, the MAC circuit adds, to the second mapping relationship, the hardware queue corresponding to the service type of the data frame.

FIG. 6 is a schematic flowchart of yet another data processing method according to an embodiment of this application. The method is applied to the MAC circuit shown in FIG. 2. As shown in FIG. 6, the method includes the following steps: S601 to S602.

S601. The MAC circuit determines whether a hardware queue group corresponding to a network property of a data frame includes a hardware queue corresponding to a service type of the data frame; and if the hardware queue group does not include the hardware queue corresponding to the service type of the data frame, the MAC circuit performs S602: The MAC circuit adds, to a second mapping relationship, the hardware queue corresponding to the service type of the data frame.

S602. The MAC circuit adds, to a second mapping relationship, the hardware queue corresponding to the service type of the data frame.

The service type of the data frame may be an IoT control service. Because a STA device of the IoT control service is fixed, the MAC circuit may determine, based on a MAC address of the STA, whether the service type of the data frame is the IoT control service. In other words, the MAC circuit may parse a receiver address (RA) in the data frame. If the RA is a preset MAC address of an IoT device, the service type of the data frame is the IoT control service, and therefore, the MAC circuit may determine that the service type of the data frame is the IoT control service.

When the MAC circuit determines that the hardware queue group corresponding to the network property of the data frame does not include a hardware queue corresponding to the IoT control service, the MAC circuit may add, to the second mapping relationship, the hardware queue corresponding to the IoT control service, and place the data frame of the IoT control service in the added hardware queue corresponding to the IoT control service.

For example, a hardware queue group G_1 corresponding to a basic service set BSSID_1 may include four hardware queues: a hardware queue Q_1 corresponding to a voice service, a hardware queue Q_2 corresponding to a video service, a hardware queue Q_3 corresponding to a background service, and a hardware queue Q_4 corresponding to a best effort service. When the MAC circuit detects that the service type of the data frame is the IoT control service, because the hardware queue group G_1 does not include a hardware queue corresponding to the IoT control service, the MAC circuit may add, to the second mapping relationship, the hardware queue corresponding to the IoT control service. To be specific, a hardware queue Q_5 corresponding to the IoT control service is added to the hardware queue group G_1. The MAC circuit places the data frame of the IoT control service in the added hardware queue corresponding to the IoT control service. The foregoing example is merely used to explain this application and shall not be construed as a limitation.

Figure 9:
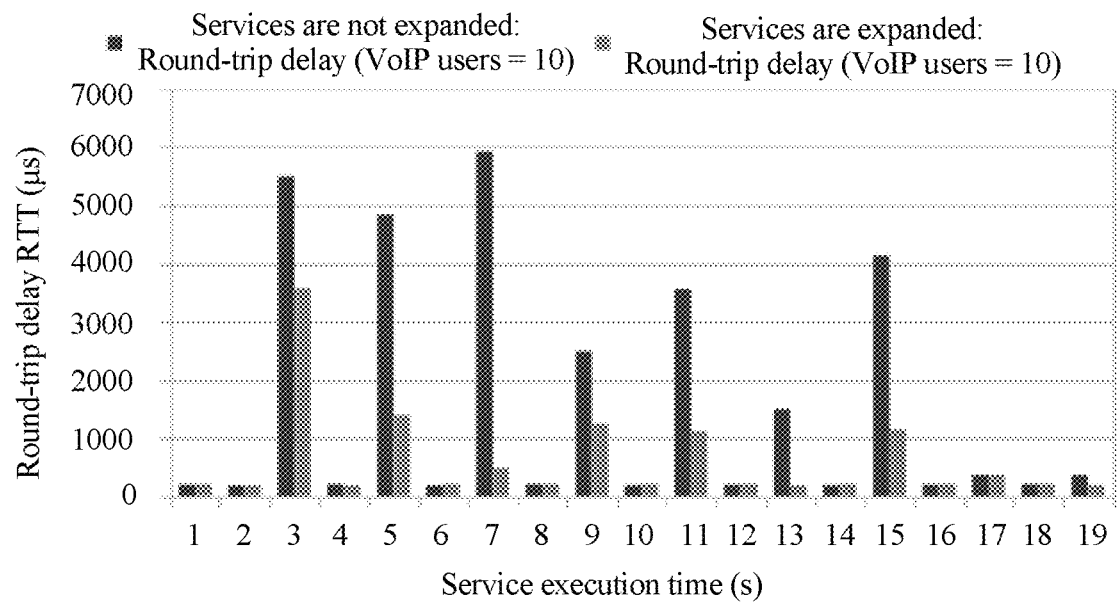
FIG. 9 is a schematic diagram of benefit comparison between still another network optimization solution and an example solution according to this application.

For a diagram of benefit comparison between the embodiment shown in FIG. 6 and an example solution, refer to FIG. 9. FIG. 9 is a schematic diagram of benefit comparison between a network optimization solution and an example solution according to this application. As shown in FIG. 9, a horizontal axis indicates a service execution time (unit: s), and a vertical axis indicates a round-trip time (RTT) (unit: μs) during execution of the service. A case in which services are not expanded indicates the example solution, to be specific, a data frame of a new service, namely, an IoT control service, and a data frame of an original service, namely, a VoIP session service (a voice service), are distributed to a same hardware queue. A case in which services are expanded indicates that a data frame of a new service, namely, an IoT control service, and a data frame of an original service, namely, a VoIP session service (a voice service), are distributed to different hardware queues. It can be learned from FIG. 9 that in the embodiment shown in FIG. 6, distribution of the data frame of the new service type, namely, the IoT control service to an independent hardware queue greatly shortens the round-trip delay.

In the embodiment shown in FIG. 6, the MAC circuit expands a hardware queue corresponding to a new service type in a first hardware queue group, and distributes the data frame of the new service type to the hardware queue obtained through expansion in the first hardware queue group. Therefore, a network delay corresponding to the new service type can be shortened, and network requirements of different services are met.

In the embodiment shown in FIG. 4, the embodiment shown in FIG. 5, and the embodiment shown in FIG. 6, the embodiments shown in FIG. 4 to FIG. 6 may be implemented independently or jointly. There is a mechanism for the MAC circuit to jointly implement the embodiments shown in FIG. 4 to FIG. 6. However, when the MAC circuit includes a limited quantity of hardware queues, the MAC circuit may preferentially implement one or two of the embodiments shown in FIG. 4 to FIG. 6.

Figure 10:
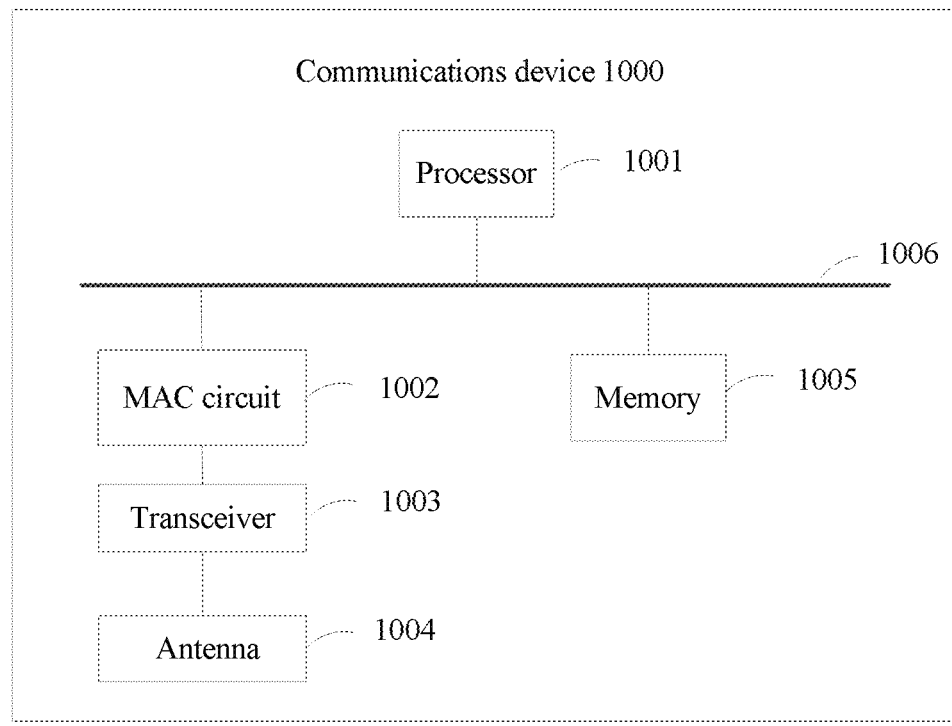
FIG. 10 is a schematic structural diagram of a communications device according to this application.

FIG. 10 is a schematic structural diagram of a communications device 1100 according to this application. As shown in FIG. 10, the communications device 1000 may include a processor 1001, a MAC circuit 1002, a receiver 1003, an antenna 1004, and a memory 1005. The processor 1001, the MAC circuit 1002, the memory 1005, and the transceiver 1003 are coupled together by using a bus 1006.

The MAC circuit 1002 is the MAC circuit 200 shown in FIG. 2. For a specific structure and a specific function of the MAC circuit 1002, refer to respective functions of the processor 210, the N hardware queues 220, and the interface circuit 230 in the embodiment shown in FIG. 2. The MAC circuit 1002 and the processor 1001 may be coupled together. Details are not described herein again.

The processor 1001 may be a CPU, a network processor (NP), or a combination of a CPU and an NP. The processor 1001 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 1003 may include a baseband processing unit, a digital-to-analog conversion unit, and a radio frequency channel module. The baseband processing unit may include units such as a digital signal processor (DSP), a micro control unit (MCU), and a transcoder and submultiplexer (TCSM) (configured to perform multiplexing, demultiplexing, and transcoding functions). The baseband processing unit may be configured to combine baseband signals to be transmitted, and decode a received baseband signal. The digital-to-analog conversion is configured to perform digital-to-analog conversion on the baseband signals to be transmitted or the received baseband signal. The radio frequency channel module may include a transmitter (TX) and a receiver (RX). The TX may be configured to transmit a signal output by the communications device 1000, for example, directionally send the signal through beamforming. The RX may be configured to receive a signal received by the antenna 1004, for example, directionally receive the signal through beamforming. In some embodiments of this application, the transmitter/receiver may include a beamforming controller, configured to multiply a sent/received signal by a weight vector, to control directional transmission/reception of the signal.

The antenna 1004 may be coupled with the receiver 1003 to jointly transmit the signal output by the communications device 1000 and receive the signal received by the communications device 1000. The antenna 1004 may be an array antenna and is configured to support a multi-user multiple-input multiple-output (MU-MIMO) technology.

The memory 1005 is coupled with the processor 1001 and configured to store various software programs and/or a plurality of sets of instructions. The memory 1005 may include a volatile memory, such as a random-access memory (RAM). The memory may include a non-volatile memory, such as a flash memory. The memory may alternatively include a combination of the foregoing types of memories. The memory 1005 may store an operating system. The memory 1005 may further store a network communication program. The network communication program may be used to communicate with one or more additional devices, one or more terminal devices, and one or more communications devices.

According to the communications device provided in this embodiment of this application, data frames with different network properties may be placed in different hardware queue groups. In this way, the data frames in virtual sub-networks identified by the different network properties are isolated from each other, so that channel access capabilities of the data frames in the virtual sub-networks identified by the different network properties do not affect each other, and different network requirements of the virtual sub-networks identified by the different network properties are met. Even if transmission performance of a data frame in a virtual sub-network identified by one network property is poor, transmission performance of data frames in virtual sub-networks identified by other network properties is not affected. Therefore, transmission performance of an entire wireless network is improved.

In the foregoing embodiments, the description of each embodiment has respective focuses. For a part that is not described in detail in an embodiment, refer to related descriptions in other embodiments.

What is claimed is:

1. A medium access control (MAC) circuit comprising:
a plurality of hardware queues divided into a plurality of hardware queue groups, wherein each hardware queue group comprises at least two of the plurality of hardware queues, and wherein the hardware queue groups are configured to store to-be-sent data frames, wherein the plurality of hardware queue groups correspond to one or more of a plurality of virtual sub-networks, and wherein the plurality of virtual sub-networks are independent of each other;
a processor in communication with the hardware queues and configured to place a data frame in a first hardware queue in a first hardware queue group, wherein the first hardware queue group corresponds to a network property of the data frame based on a first mapping relationship comprising mappings from a plurality of network properties to the plurality of hardware queue groups, wherein the first hardware queue corresponds to a service type of the data frame based on a second mapping relationship comprising mappings from a plurality of service types to a plurality of hardware queues in the first hardware queue group, and wherein the network property of the data frame identifies one virtual sub-network of the plurality of virtual sub-networks; and
an interface circuit configured to send the data frame from the plurality of hardware queues through a radio channel.

2. The MAC circuit of claim 1, wherein the network property comprises an address of a station, wherein the processor is further configured to adjust a mapping of the address of the station in the first mapping relationship to a mapping from the address of the station to a second hardware queue group when a retransmission value of the station is greater than a first threshold, wherein the second hardware queue group comprises one or more of the plurality of hardware queues and not of the plurality of hardware queue groups, and wherein after the adjustment, a retransmission value of a station identified by any address in a mapping pointing to the second hardware queue group in the first mapping relationship is greater than the first threshold.

3. The MAC circuit of claim 1, wherein the processor is further configured to add, to the second mapping relationship, a hardware queue corresponding to the service type in the hardware queue group when a quantity of flows of a service type belonging to one of the plurality of hardware queue groups meets a first condition, wherein the first condition comprises a ratio of the quantity of flows of the service type belonging to the hardware queue group to a quantity of hardware queues corresponding to the service type being greater than a second threshold.

4. The MAC circuit of claim 1, wherein the processor is further configured to add, to the second mapping relation-ship, the hardware queue corresponding to the service type of the data frame when the hardware queue group corresponding to the network property of the data frame does not comprise a hardware queue corresponding to the service type of the data frame.

5. The MAC circuit of claim 1, wherein the processor is further configured to determine the network property of the data frame based upon an address field of a frame header of the data frame.

6. The MAC circuit of claim 1, wherein the processor is further configured to determine the service type of the data frame based upon a port number of the data frame.

7. The MAC circuit of claim 1, wherein the processor is further configured to determine the service type of the data frame based upon a quality of service (QoS) control field of the data frame.

8. A data processing method implemented by a medium access control (MAC) circuit, wherein the method comprises:
placing a data frame in a first hardware queue of a first hardware queue group, wherein the MAC circuit comprises a plurality of hardware queues grouped into a plurality of hardware queue groups, wherein each hardware queue group comprises a plurality of hardware queues, wherein each of the plurality of hardware queue groups corresponds to one or more of a plurality of virtual sub-networks, wherein the plurality of virtual sub-networks are independent of each other, wherein the first hardware queue group corresponds to a network property of the data frame based on a first mapping relationship comprising mappings from a plurality of network properties to the plurality of hardware queue groups, wherein the first hardware queue corresponds to a service type of the data frame based on a second mapping relationship comprising mappings from a plurality of service types to a plurality of hardware queues in the hardware queue group corresponding to the network property of the data frame, and wherein the network property of the data frame identifies one virtual sub-network of the plurality of virtual sub-networks; and
sending the data frame through a radio channel.

9. The data processing method of claim 8, wherein the network property comprises an address of a station, and the method further comprises adjusting a mapping of the address of the station in the first mapping relationship to a mapping from the address of the station to a second hardware queue group when a retransmission value of the station is greater than a first threshold, wherein the second hardware queue group comprises one or more of the plurality of hardware queues not of the plurality of hardware queue groups, and wherein after the adjustment, a retransmission value of a station identified by any address in a mapping pointing to the second hardware queue group in the first mapping relationship is greater than the first threshold.

10. The data processing method of claim 8, further comprising adding, to the second mapping relationship, a hardware queue corresponding to the service type in the hardware queue group when a quantity of flows of a service type belonging to one of the plurality of hardware queue groups meets a first condition comprising a ratio of the quantity of flows of the service type belonging to the hardware queue group to a quantity of hardware queues corresponding to the service type being greater than a second threshold.

11. The data processing method of claim 8, further comprising adding, to the second mapping relationship, the hardware queue corresponding to the service type of the data frame when the hardware queue group corresponding to the network property of the data frame does not comprise a hardware queue corresponding to the service type of the data frame.

12. The data processing method of claim 8, further comprising determining the network property of the data frame based upon an address field of a frame header of the data frame.

13. The data processing method of claim 8, further comprising determining the service type of the data frame based upon a port number of the data frame.

14. A communications device comprising:
an antenna; and
a medium access control (MAC) circuit coupled to the antenna, wherein the MAC circuit comprises:
   a plurality of hardware queues divided into a plurality of hardware queue groups, wherein each hardware queue group comprises at least two of the plurality of hardware queues, wherein the hardware queue groups are configured to store to-be-sent data frames, wherein the plurality of hardware queue groups correspond to one or more of a plurality of virtual sub-networks, and wherein the plurality of virtual sub-networks are independent of each other;
   a processor in communication with the hardware queues and configured to place a data frame in a first hardware queue in a first hardware queue group, wherein the first hardware queue group corresponds to a network property of the data frame based on a first mapping relationship comprising mappings from a plurality of network properties to the plurality of hardware queue groups, wherein the first hardware queue corresponds to a service type of the data frame based on a second mapping relationship comprising mappings from a plurality of service types to a plurality of hardware queues in the first hardware queue group, and wherein the network property of the data frame identifies one virtual sub-network of the plurality of virtual sub-networks; and
   an interface circuit in communication with the hardware queues and the processor and configured to send the data frame from the plurality of hardware queues through a radio channel using the antenna.

15. The communications device of claim 14, wherein the network property comprises an address of a station, wherein the processor is further configured to adjust a mapping of the address of the station in the first mapping relationship to a mapping from the address of the station to a second hardware queue group when a retransmission value of the station is greater than a first threshold, wherein the second hardware queue group comprises one or more of the plurality of hardware queues not of the plurality of hardware queue groups, and wherein after the adjustment, a retransmission value of a station identified by any address in a mapping pointing to the second hardware queue group in the first mapping relationship is greater than the first threshold.

16. The communications device of claim 14, wherein the processor is further configured to add, to the second mapping relationship, a hardware queue corresponding to the service type in the hardware queue group when a quantity of flows of a service type belonging to one of the plurality of hardware queue groups meets a first condition, wherein the first condition comprises a ratio of the quantity of flows of the service type belonging to the hardware queue group to a quantity of hardware queues corresponding to the service type being greater than a second threshold.

17. The communications device of claim 14, wherein the processor is further configured to add, to the second mapping relationship, the hardware queue corresponding to the service type of the data frame when the hardware queue group corresponding to the network property of the data frame does not comprise a hardware queue corresponding to the service type of the data frame.

18. The communications device of claim 14, wherein the processor is further configured to determine the network property of the data frame based upon an address field of a frame header of the data frame.

19. The communications device of claim 14, wherein the processor is further configured to determine the service type of the data frame based upon a port number of the data frame.

20. The communications device of claim 14, wherein the processor is further configured to determine the service type of the data frame based upon a quality of service (QoS) control field of the data frame.

* * * * *

UNITED STATES PATENT AND TRADEMARK OFFICE
CERTIFICATE OF CORRECTION

PATENT NO. : 11,490,449 B2  
APPLICATION NO. : 17/306320  
DATED : November 1, 2022  
INVENTOR(S) : Peng Liu It is certified that error appears in the above-identified patent and that said Letters Patent is hereby corrected as shown below:

On the Title Page

(56) References Cited, U.S. Patent Documents: "3,036,124 A1 10/2011 Motwani" should read "8,036,124 A1 10/2011 Motwani".

Signed and Sealed this  
Twenty-seventh Day of December, 2022

Katherine Kelly Vidal  
*Director of the United States Patent and Trademark Office*